United States Patent
O'Gorman et al.

(10) Patent No.: US 7,193,395 B2
(45) Date of Patent: Mar. 20, 2007

(54) SYSTEMS AND METHOD FOR BOOSTING OUTPUT OF AN ALTERNATOR

(75) Inventors: Patrick A. O'Gorman, Grayslake, IL (US); Dennis L. Stephens, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 79 days.

(21) Appl. No.: 11/389,781

(22) Filed: Mar. 27, 2006

(65) Prior Publication Data

US 2006/0164046 A1    Jul. 27, 2006

Related U.S. Application Data

(62) Division of application No. 10/921,009, filed on Aug. 18, 2004.

(51) Int. Cl.
*H02J 7/14* (2006.01)
(52) U.S. Cl. .............................. 322/8; 322/28; 322/89; 322/99
(58) Field of Classification Search ................ 322/7, 322/8, 25, 28, 37, 89, 99
See application file for complete search history.

(56) References Cited

U.S. PATENT DOCUMENTS

| | | | | |
|---|---|---|---|---|
| 3,789,287 A | * | 1/1974 | Wu ............................ | 320/123 |
| 4,035,714 A | * | 7/1977 | Sato ............................ | 322/28 |
| 4,081,740 A | * | 3/1978 | Teratani et al. ............... | 322/28 |
| 4,293,811 A | * | 10/1981 | Muto et al. .................... | 322/60 |
| 4,362,983 A | * | 12/1982 | Mori et al. .................... | 322/28 |
| 4,543,521 A | * | 9/1985 | Morishita et al. ........... | 320/123 |
| 5,397,975 A | * | 3/1995 | Syverson ...................... | 322/46 |
| 5,631,544 A | | 5/1997 | Syverson et al. | |
| 5,634,544 A | | 6/1997 | Bruner et al. | |

(Continued)

FOREIGN PATENT DOCUMENTS

EP    0533037    4/1996

OTHER PUBLICATIONS

Karl J. Astrom, Bjourn Wittenmark; Computer-Controlled Systems Theory and Design Second Edition, book, 1990, 27 pages, Prentice Hall, Englewood Cliffs, New Jersey 07632.

(Continued)

*Primary Examiner*—Nicholas Ponomarenko
(74) *Attorney, Agent, or Firm*—Terri S. Hughes; Gary J. Cunningham

(57) ABSTRACT

Disclosed herein are two techniques, neutral point switching and field voltage boost, that will increase the output of today's 12 volt automotive electrical systems in vehicle idle conditions solely by the addition of circuitry. Neutral point switching enables the flow of a third harmonic current, which does not normally flow at low speeds, but only at high speed. Boosting the field voltages can be obtained by integrating a field voltage boost circuit and voltage regulator to increase the field voltage, and consequently the field current, above the level obtained from the battery. Furthermore, the transient response of the alternator to a change in load is improved by temporarily increasing the field voltage above the level needed to sustain the load. These two techniques are compatible, and thus may be implemented together, or may be implemented independently. No changes to a standard alternator are required to accommodate the proposed additional circuitry.

11 Claims, 5 Drawing Sheets

U.S. PATENT DOCUMENTS

| | | | |
|---|---|---|---|
| 5,719,486 A * | 2/1998 | Taniguchi et al. | 322/28 |
| 5,914,542 A | 6/1999 | Weimer et al. | |
| 5,973,482 A | 10/1999 | Meinert | |
| 6,392,348 B1 * | 5/2002 | Dougherty | 315/82 |
| 2002/0053560 A1 | 5/2002 | Bunker et al. | |
| 2002/0139593 A1 | 10/2002 | Charaudeau et al. | |
| 2003/0075997 A1 | 4/2003 | Keim et al. | |

OTHER PUBLICATIONS

A.E Fitzgerald, Charles Kingsley, Jr., Stephen D. Umans, Electric Machinery—Fourth Edition Book, 1983, 105 pages, McGraw-Hill Book, Company, United States of America.

Bosch, Automotive Electrics and Electronics Third Edition, book, 1999, 312 pages, Robert Bosch GmbH, Stuttgart, Germany.

Bosch, Automotive Electrics and Electronics Second Edition, book, 1995, 376 pages, Robert Bosch GmbH, Stuttgart, Germany.

T.J.E. Miller, Brushless Permanent-Magnet and Reluctance Motor Drives, book, 1989, 165 pages, Oxford University Press, Oxford, New York.

Isidor Buchmann, Charging the Lead-Acid Battery, on-line article, April 2003, 4 pages, www.batteryuniversity.com.

Ridley Engineering, Inc., An Accurate and Practical Small-Signal Model for Current-Mode Control, journal, 1999, 21 pages, Ridley Engineering, Inc., United States.

* cited by examiner

SYSTEMS AND METHOD FOR BOOSTING OUTPUT OF AN ALTERNATOR

The present application is a divisional application of, and claims priority and full benefit under 35 U.S.C. § 120 of previous U.S. patent application Ser. No. 10/921,009, for "Systems and Method for Boosting Output of an Alternantor", filed Aug. 18, 2004, and assigned to Motorola, Inc., and which is incorporated herein by reference in its entirety.

FIELD OF THE INVENTION

This invention relates to automotive electrical systems. More particularly, the invention relates to configurations of automotive electrical power systems adapted for use with high power loads.

BACKGROUND

The 12 volt systems used in today's automobiles are required to supply ever increasing currents as the load on the system continues to increase. This increase is due to a combination of increasing numbers of electronic devices, such as communication, entertainment, and telematics systems, as well as the proliferation of electric powered auxiliary systems to replace traditional hydraulic or mechanical powered systems. To reduce the amount of current required to supply these higher loads, it has been proposed that automobiles should adopt 42 volt electrical systems. However, the automotive industry has been reluctant to transition to 42 volt electrical systems because of increased costs. Consequently, there is a strong demand to improve the performance of 12 volt systems, thereby allowing higher electrical loads to operate effectively with conventional vehicle electrical systems.

One principal limitation in the performance of automotive electrical systems is the alternator, and particularly the amount of current that can be drawn from the alternator and the response time required to draw this current. The output current capability of today's automotive alternator is influenced by the speed at which the alternator is operating, which is determined by the engine speed of the vehicle. A typical alternator might produces a rated current of 135 amperes at an engine speed of 3000 rpm, might typically produces only 60 amperes at an engine speed of 600 rpm (corresponding to engine idle). Most automotive electrical loads are insensitive to vehicle speed, such as rear window defoggers, heated seats, lights, HVAC blowers, entertainment devices, etc. The loads that are sensitive to engine speed (e.g., ignition) do not consume significant current. Consequently, the electrical system is in significant current deficit at idle, which can produce voltage fluctuations if additional current is required. Furthermore, because some loads are very sensitive to voltage fluctuations (e.g., lights), an alternator that responds quickly to large load application will reduce the undesirable effects of voltage fluctuations, such as light flickering, seen by the driver.

It bears mentioning that the problem addressed herein is not one of power limitation where the alternator cannot supply sufficient power, but rather is a problem of voltage limitation. Fundamentally, the back emf (electromotive force) produced by the alternator is not large enough to supply the required current at engine idle, even with the field current at its max value.

Solutions to address certain aspects of the performance deficiencies in automotive electrical systems are addressed in co-pending U.S. patent application, having the Ser. No. 10/927,687, filed Aug. 27, 2004, and entitled "Automotive Electrical System Configuration." This patent application is hereby incorporated by reference in its entirety. The present invention attempts to further minimize the above-mentioned drawbacks and proposes a system that solves or at least minimizes the problems of the prior art.

SUMMARY OF THE INVENTION

Disclosed herein are two techniques, neutral point switching and field voltage boost, that will increase the output of today's 12 volt automotive electrical systems in vehicle idle conditions solely by the addition of circuitry. Neutral point switching enables the flow of a third harmonic current, which does not normally flow at low speeds, but only at high speed. Boosting the field voltages can be obtained by integrating a field voltage boost circuit and voltage regulator to increase the field voltage, and consequently the field current, above the level obtain from the battery. Furthermore, the transient response of the alternator to a change in load is improved by temporarily increasing the field voltage above the level needed to sustain the load. These two techniques are compatible, and thus may be implemented together, or may be implemented independently. No changes to a standard alternator are required to accommodate the proposed additional circuitry.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 1:
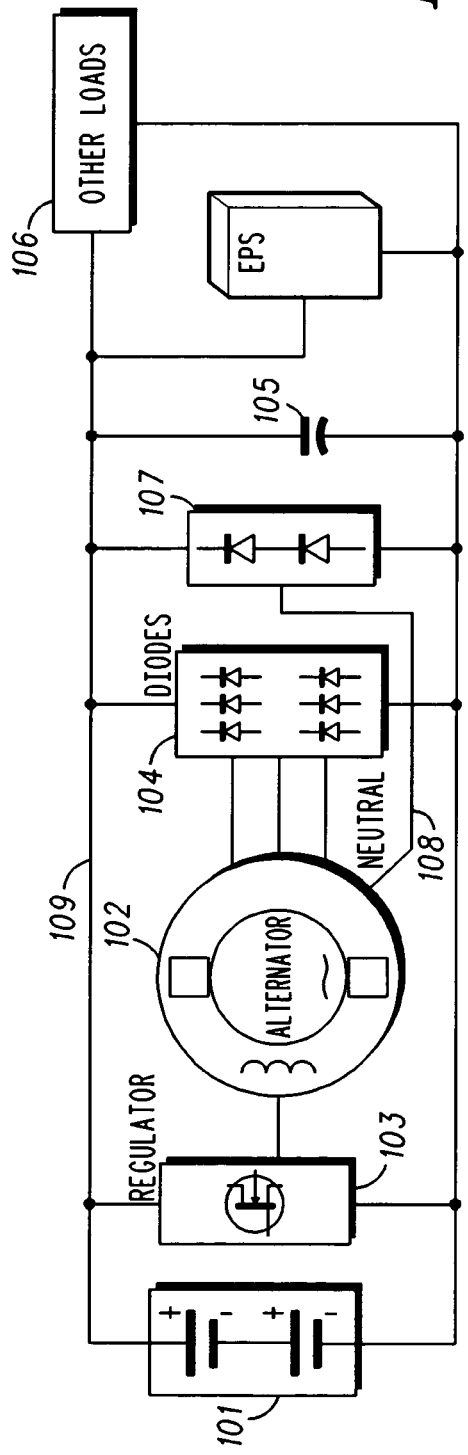
FIG. 1 illustrates a prior art circuit used in some automobile charging systems having a pair of diodes connected across the alternator's neutral terminal.

As noted above, the present disclosure is directed to techniques for improving the response of an automotive-type electrical system, and more particularly for improving alternator performance. A typical prior art automotive electrical system is illustrated in FIG. 1. The electrical system comprises a battery 101, which stores electrical energy for use when the vehicle is not running and when alternator 102 is unable to supply the full amount of electrical energy required by loads 106.

Under normal, steady state, operating conditions alternator 102, driven via a belt by the vehicle engine (not shown) generates the electrical energy required by loads 106. However, because the rest of the electrical system is DC, the AC voltage produced by alternator 102 must be rectified using rectifier bank 104. As illustrated rectifier bank 104 is a three phase full wave diode bridge, but other forms of rectifiers, including those using switched semiconductors such as silicon controlled rectifiers or transistors (e.g., FETs) could be used. Regulator 103 is used to control the field voltage of alternator 102, and consequently the field current, to regulate the voltage ultimately produced on the positive DC bus 109 of the electrical system. Design and operation of such regulators is well known in the art, and details may be found in "Automotive Electrics and Electronics", Bosch Automotive Handbook, $3^{rd}$ Edition, pp. 138–142, which is incorporated by reference in its entirety.

In some automotive electrical systems, a pair of diodes 107 is provided connecting at their junction to the neutral lead of alternator 102 to provide additional charging current at high engine speeds. The extra current results from third harmonic current generated because the output voltage of most alternators is approximately a square wave. Square wave alternators are used because it is cheaper and more efficient to manufacture a square-wave alternator as opposed to a pure sine wave alternator. The square wave waveform contains measurable third harmonic voltage, which does not contribute to the alternator output if the typical six diode bridge is used. (The third harmonic voltages for each alternator leg are in phase with each other and thus there is no differential third harmonic voltage difference between any two of three phases. However, these voltages are measurable between phase and neutral points.) Thus an additional pair of diodes 107 may be added, with the diode pair center point connected to the alternator neutral 108, as shown in FIG. 1. This diode pair does not conduct until the amplitude of the third harmonic is large enough to forward bias the diodes. This occurs at relatively high engine speeds and does not contribute significantly to the charging current at idle. When the amplitude of the third harmonic is large enough to forward bias a diode pair, one of the diodes in the neutral leg conducts, say the upper diode, while the return path is one of the lower three diodes of the conventional six diode rectifier bridge. When the third harmonic voltage switches polarity, the lower neutral diode conducts and one of the three upper conventional diodes provides the return path.

One technique for increasing the current drawn from today's 12 volt alternator at vehicle idle is to add an additional circuit to the alternator neutral point. This circuit should draw current from the neutral point at idle that would otherwise not be generated. This circuit is not to be confused with the additional diode pair connected to the neutral which only adds to the charging current at high alternator speeds. The circuit needed, illustrated in FIG. 2, replaces this auxiliary diode pair 107 with a pair of FETs 207 that can be actively switched to force a third harmonic current to flow at idle. The control scheme uses a square wave to control the switching of the FET pair. Maximum third harmonic current will be drawn from the alternator if this square wave is 90 degrees out of phase with the neutral voltage, assuming zero alternator winding resistance. In reality, this resistance must be included and the actual angle depends on the value of alternator resistance, alternator inductance, alternator pole count and alternator speed. Alternatively, the current drawn may be modulated by replacing the square wave with a PWM (pulse width modulated) waveform.

Figure 2:
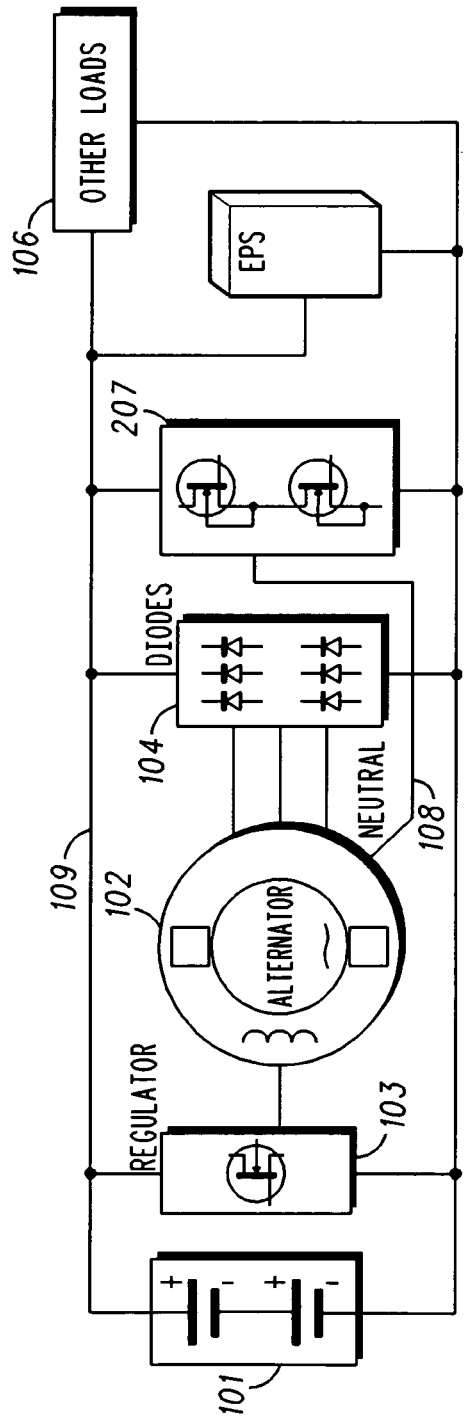
FIG. 2 illustrates a variation of the circuit of FIG. 1 in which the diodes are replaced with field effect transistors (FETs).

For the remainder of the discussion, it will be assumed that the maximum current is required, and the phase of the square wave used to drive the auxiliary FETs 207 is controlled to produce maximum current. (Techniques for determining the proper square wave phase, such as lookup tables or searcher algorithms are described below.) The current drawn from the battery as a function of battery voltage is shown in Table 1. The first column indicates the battery voltage. The second column gives the neutral current using only diodes 107 as illustrated in FIG. 1. The third column gives neutral current using FETs 207 as illustrated in FIG. 2.

TABLE 1

| Battery voltage | no neutral switches | with neutral switches | neutral switches and buck (Vbuck = 15) |
|---|---|---|---|
| 13 V | 48.1 A | 48.8 A | 58.5 A |
| 14 V | 44.3 A | 47 A | 51.3 A |

Figure 3A:
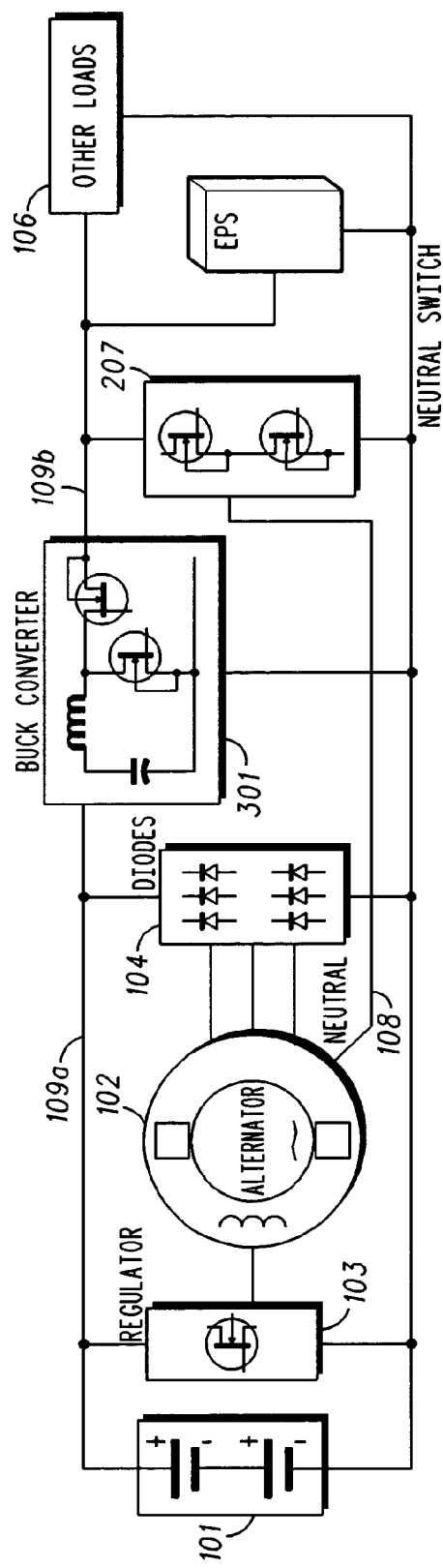
FIG. 3A illustrates yet another variation of the circuit of FIGS. 1 and 2 further comprising a buck converter connected between the battery/alternator side of the bus, i.e., the supply side of the bus, and the load side of the bus.

The neutral current drawn from the alternator may be further enhanced by disconnecting the upper FET from the battery voltage (i.e., positive DC bus 109) and connecting it to an intermediate voltage that is higher than battery voltage. This configuration is shown in FIG. 3A. The intermediate voltage is regulated by buck converter 301, which bucks the intermediate voltage of bus 109b down to the typical bus voltage of positive DC bus 109a. The voltage of DC bus 109a is regulated to an appropriate voltage for battery charging.

The voltage-time product for auxiliary switches 207 must be balanced so the lower switch of the pair is conducting for more than 50% of the voltage-time product, while the upper switch conducts less than 50% . Otherwise, the third harmonic current drawn from the alternator will have a DC component, leading to reduced overall current output as the alternator saturates. The current drawn for this enhanced circuit is shown in the fourth column of Table 1.

Figure 3B:
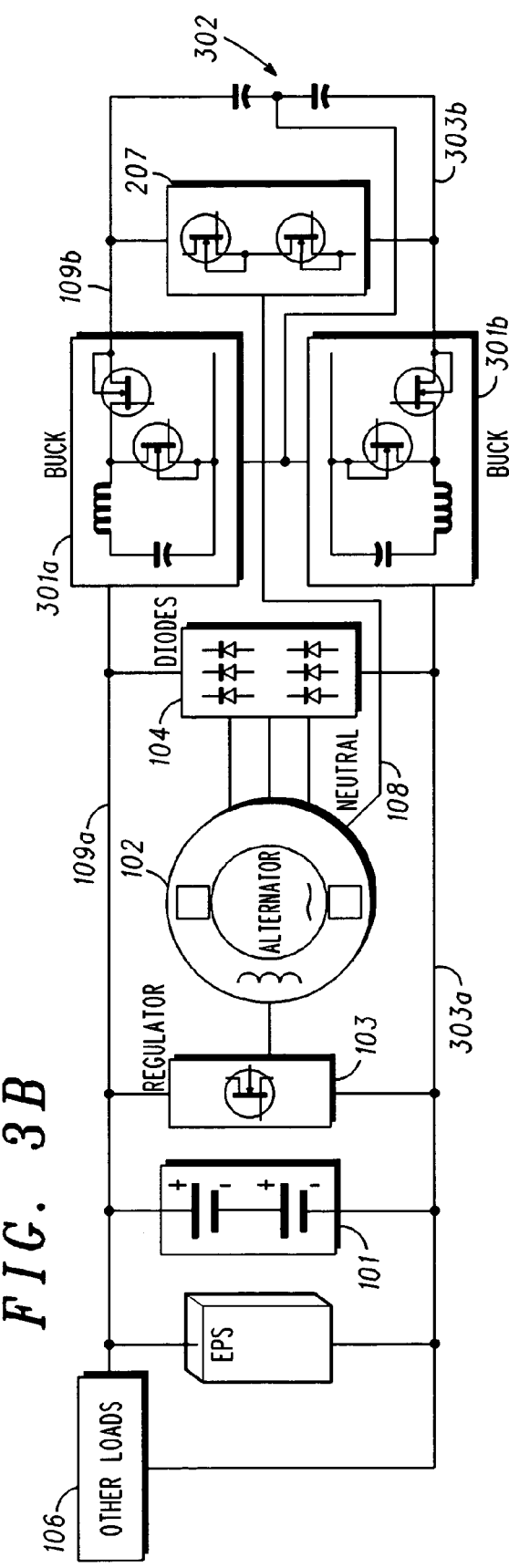
FIG. 3B illustrates a further modification of the circuit of FIG. 3A in which an additional buck converter is provided for the negative DC bus.

Another variation of the neutral current switching circuit is illustrated in FIG. 3B. This circuit is similar to that of FIG. 3A, but a second buck converter has been added in the negative voltage bus 303a to lower this voltage of bus 303b below the voltage of negative voltage bus 303a. Additionally, the loads are now supplied from the normal bus, and the 109b/303b bus is essentially a short term storage bus because of capacitors 302. In this case, the voltage seen by the alternator is balanced and a 50% square wave is used to control the operation of the neutral switch pair.

Figure 3C:
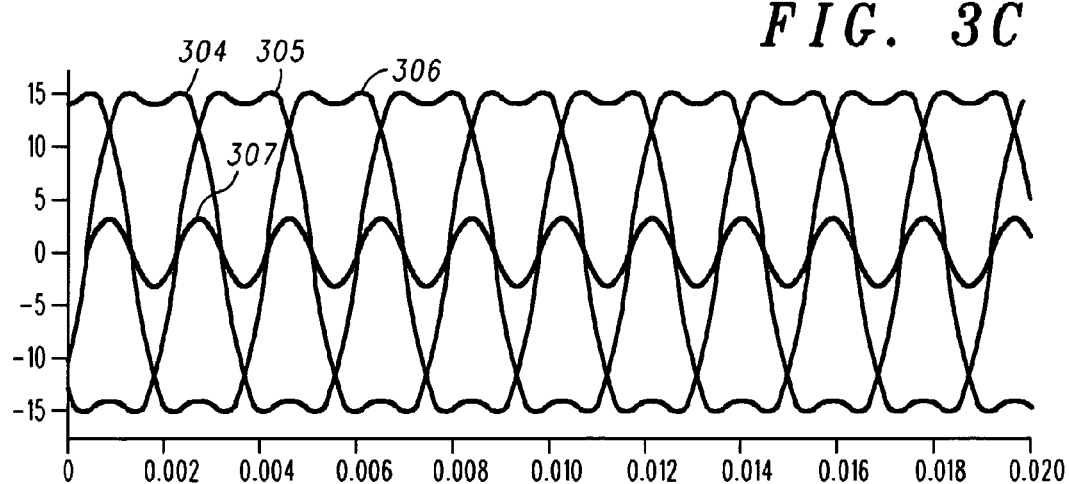
FIGS. 3C–3E illustrate typical waveforms of the circuit illustrated in FIG. 3B.
Figure 3D:
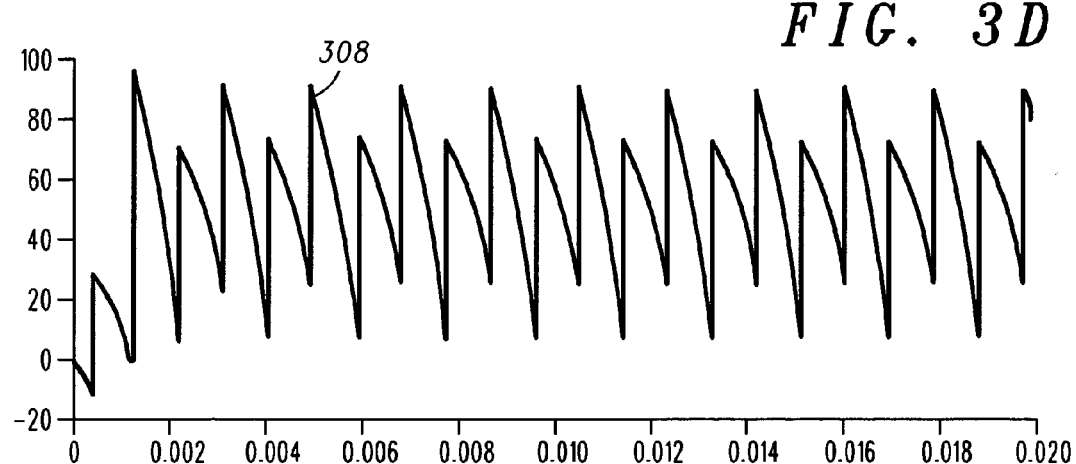
Figure 3E:
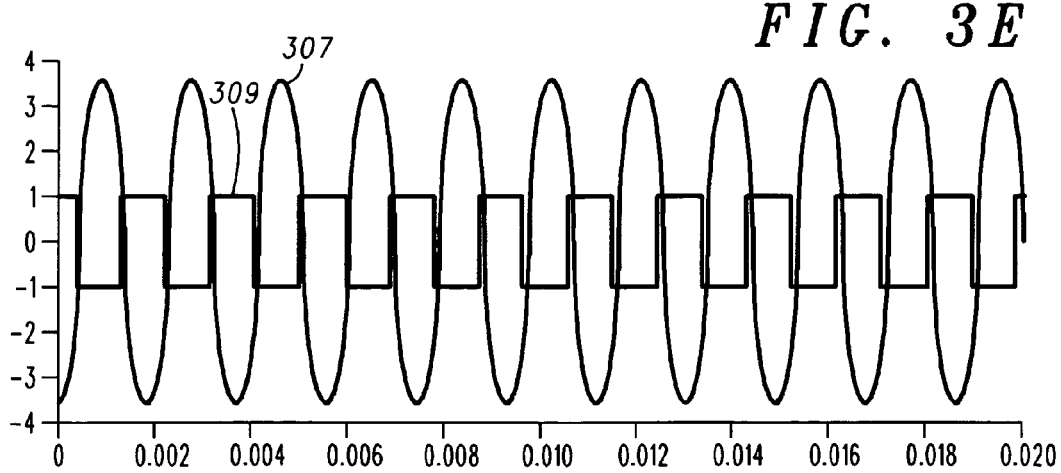

Typical waveforms of the FIG. 3B circuit are shown in FIGS. 3C, 3D, and 3E. FIG. 3C shows the back emf waveforms for each phase 304, 305, and 306. FIG. 3C also shows the 20% third harmonic component 307. FIG. 3D shows the current 308 into the battery, which is a sum of the current from the diode bridge and the double buck converters. FIG. 3E illustrates the relationship between the third harmonic phase 307 and the phase of the switching square wave 309. In this case, the phase difference is almost 180 degrees. This relatively large phase difference is because the winding resistance of the alternator is included in the model. The alternator parameters used in the circuit model are: inductance of 105 μH, resistance of 33 mΩ, speed 1800 rpm, 6 pole pair stator alternator winding.

The neutral point FETs are switched with 50% duty cycle at the frequency of the third harmonic. A shaft position sensor, such as a resolver, may be used to determine shaft position so that the frequency and phase of the 50% square wave is synchronized with the frequency and phase of the third harmonic voltage. The phase angle of the switching square wave must lag the phase angle of the third harmonic component to compensate for the phase shift that occurs across the alternator impedance (inductance and resistance). The required phase difference will, of course, vary as a function of alternator current. One way to provide the switching circuit with the appropriate phase shift values is to calculate it for certain current values (based on alternator resistance and inductance) and provide a lookup table in the neutral switch controller. Alternatively, the phase shift may be determined on-line by a searcher algorithm that continuously varies the phase until maximum power is obtained.

An alternative technique to neutral point switching that will also increase the alternator output is to increase the field current into the alternator. The regulators used in conventional automotive electrical systems are not capable of increasing the field current above the limit established by the battery voltage and field resistance. This limitation may be overcome by adding a boost converter circuit to increase the voltage into the regulator above the battery voltage. This consequently increases the maximum possible field current.

Figure 4:
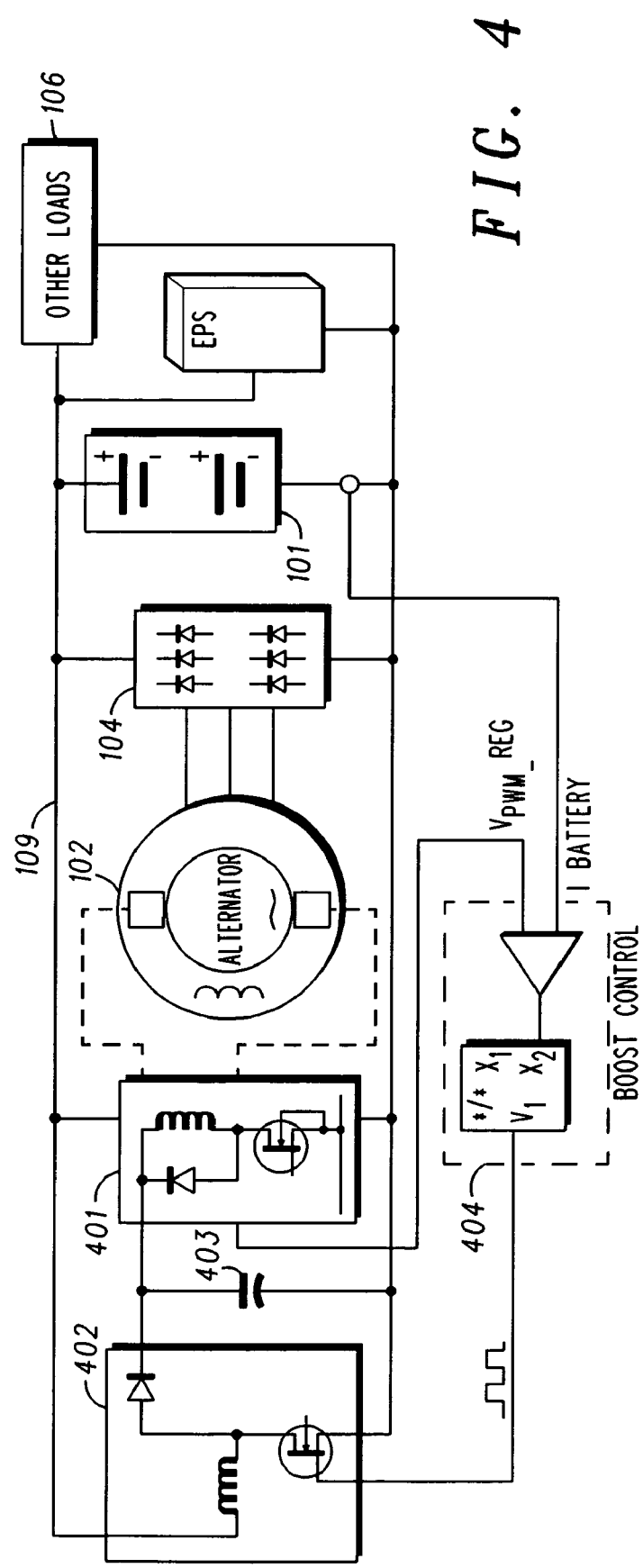
FIG. 4 illustrates a field voltage boost circuit in accordance with certain teachings of the present disclosure.

Such a circuit is illustrated in FIG. 4. A field voltage boost circuit 402 is placed between the positive DC bus 109 and the "top" of the alternator field winding, as illustrated. (Capacitor 403 smoothes the voltage out of boost circuit 402.) This allows boost circuit 402 to increase the maximum voltage applied to the alternator's field winding, which allows greater field current than can be achieved with battery voltage alone. The voltage profile output by boost circuit 402 is intended to overcome the relatively large time constant associated with the field winding (300 ms is a typical number). It is anticipated that a boost to the field winding voltage will be required by the activation of a large load (e.g., electric power steering or "EPS"), and thus the current drawn from the battery increases proportionally. Thus the battery current is used as an input to boost control circuit 404 as a feedforward signal. It may be more beneficial to use the current drawn from the large loads as a feedforward signal, depending on the system configuration and parameters.

For relatively small load changes, the boost is activated when the regulator duty cycle is greater than a predetermined threshold (95%, for example). The boost is turned off when the regulator duty cycle falls below a second predetermined threshold less than the first predetermined threshold (90%, for example). This hysteresis is desirable to prevent the boost converter from interacting with the dynamics of the voltage regulator. Once the boost circuit is activated, the regulator duty cycle is maintained within the upper and lower bounds by a control loop which determines how the boost voltage is modified. For example, at a periodic interval, e.g., 1 ms, the regulator duty cycle is determined. If the duty cycle exceeds the upper bound the boost voltage is increased by 0.1 V. However, if the duty cycle is less than the lower bound, the boost voltage is decreased by 0.1V. In this manner, the regulator duty is maintained with the desired bounds. Other techniques may also be used to regulate the boost output voltage. For example, a PI (proportional-integral) loop may be used to regulate the boost output voltage to the average of the upper and lower bounds.

As noted above, the battery current is monitored to determine when a large change in load occurs. The regulator PWM parameters are tuned so that small load changes will result in suitable field voltage changes. However, in the case of a sufficiently large load transient, the regulator will attempt to establish a PWM duty cycle exceeding 100%, and thus the regulator alone cannot be used to determine field voltage. In this case, the battery current is used to generate an estimate of the new field current required and a final boost output voltage ($V_{final}$) is determined to re-establish operation of the regulator within the duty cycle range determined by the predetermined thresholds, (e.g., the 90%–95% range).

The field voltage is regulated according to:

$$V_f = K_P \cdot (13.5 - V_{alt}) + K_I \int (13.5 - V_{alt}) + K_{FF} \cdot I_{bat}$$

where $V_f$ is the field voltage, $K_P$ and $K_I$ are the proportional and integral gains of a well-known PI (proportional-integral) controller, $V_{alt}$ is the alternator voltage, $K_{FF}$ is the feed forward gain and $I_{bat}$ is the battery current. Selection of an appropriate feed forward gain for the battery current will lead to an increase or decrease in field voltage before the output voltage changes. Design techniques for these controllers are generally known to those skilled in the art, and may also be found in "Computer Controlled Systems: Theory and Design", by Astrom/Wittenmark, 1990, pp. 150–151 (which is incorporated by reference). The feedforward gain, $K_{ff}$, may be varied as a function of field current if the alternator rotor is in saturation. When the rotor is in saturation, an increase in field current results in a smaller increase in back emf and a correspondingly smaller increase in battery charging current, i.e., diminishing returns. The saturation phenomenon is explained in "Electric Machinery", by Fitzgerald et.al., 1983, p. 176–178, which is incorporated by reference. When the machine is saturated, a plot of field current versus open circuit voltage shows a deviation from a straight line. As the field current increases and saturation begins, the constant slope reduces as the output voltage increase in less than the field current increase. Ideally, $K_{ff}$ is modified so that the product of $K_{ff}$ and the inverse of the open circuit curve slope is a constant. In effect, $K_{ff}$ increases at the onset of saturation and continues to increase as the amount of saturation increases.

Figure 5:
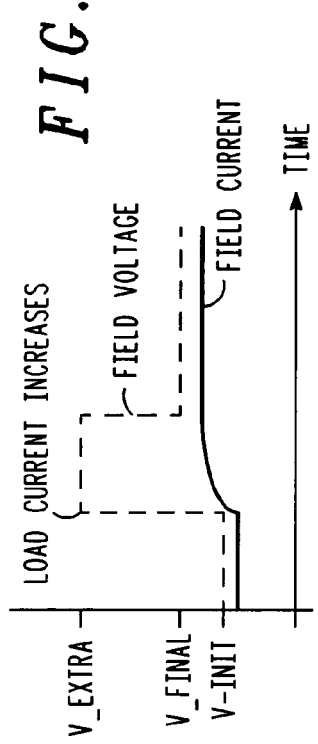
FIG. 5 is a plot of field current and voltage versus time for a load current increase.

Transient performance of the circuit of FIG. 4 may be further enhanced by increasing the boost voltage above $V_{final}$, as shown in FIG. 5. This decreases the time required for the field current to reach its final value. In this case, the time for which this additional boost voltage is applied can be calculated as illustrated in the equations below. The final value of field current is given by:

$$I_{f\_final} = I_{f\_init} + \frac{V_{extra}}{R_f}\left(1 - e^{\frac{-t}{\tau}}\right)$$

where $I_{f\_final}$ is the final field current, $I_{f\_init}$ is the initial field current, $V_{extra}$ is the temporary boost voltage, $R_f$ is the field winding resistance, and $\tau$ is the alternator time constant. Rearranging this equation, the time t becomes:

$$t = \ln\left(\frac{V_{extra}}{V_{extra} - (I_{f\_final} - I_{f\_init}) \cdot R_f}\right)$$

For example, if $V_{extra}$=30V, $R_f$=3Ω, $I_{f\_delta}$=1A, τ=300 ms, then τ=32 ms. The above calculation illustrates how the response time of the alternator is increased by temporarily increasing the field voltage above its final value. In practice, it may be necessary to include the effects of alternator field saturation, which will slow the alternator response somewhat. This calculation must be performed on a case by case basis depending on the parameters of the particular alternator chosen.

When load is removed, normal regulator operation is used to reduce the regulator PWM while the boost voltage is gradually reduced to bring the PWM back to the 90% to 95% range. The dynamics in this case are the same as for a small increase in load current. Of course, the load may have dropped low enough that when the boost is shut off the regulator PWM does not exceed 90%.

Figure 6:
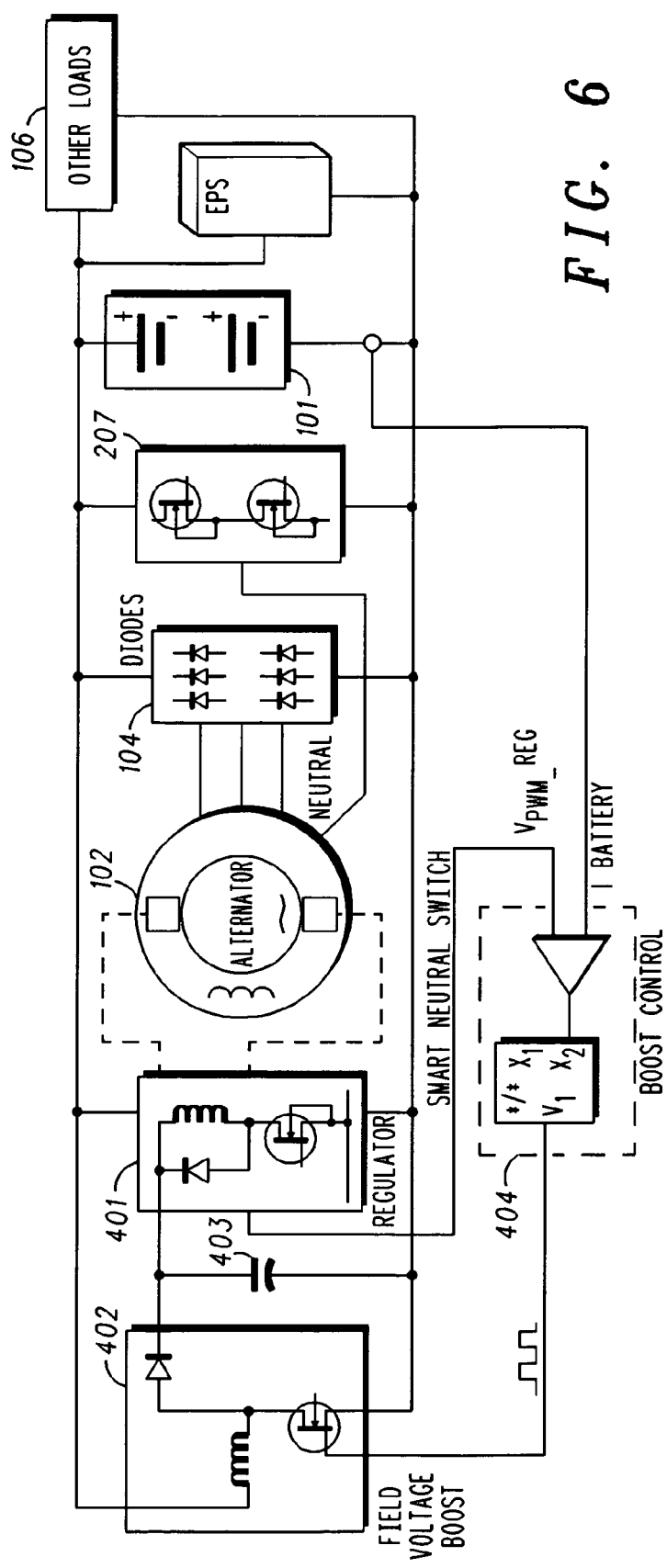
FIG. 6 illustrates a circuit in which neutral point switching is combined with field voltage boost.

FIG. 6 illustrates a circuit in which neutral point switching is combined with field voltage boost. Operation of this circuit incorporates both concepts and further improves alternator transient response.

It should be understood that the inventive concepts disclosed herein are capable of many modifications, combinations and subcombinations. Furthermore, the block diagram elements shown in the figures are meant to illustrate the inventive concepts described herein and are not intended to be complete circuit diagrams. It is intended that this patent be afforded the full scope of the appended claims and their equivalents.

What is claimed is:

1. An automotive electrical system comprising:
    a storage battery having a positive terminal connected to a positive bus and a negative terminal connected to a negative bus;
    an alternator having its output connected to a rectifier bank, wherein the output terminals of the rectifier bank are connected to the positive bus and the negative bus;
    a voltage regulator configured to control a field current of the alternator in response to the voltage between the positive bus and the negative bus; and
    a neutral switch comprising a first switching device and a second switching device, wherein the first switching device is connected between a neutral terminal of the alternator and the positive bus and wherein the second switching device is connected between the neutral terminal of the alternator and the negative bus, the neutral switch being configured to allow third harmonic current generated by the alternator to flow to one or more loads connected between the positive bus and the negative bus.

2. The automotive electrical system of claim 1 wherein the switching devices are controlled by a square wave out of phase with the third harmonic voltage on the neutral conductor.

3. The automotive electrical system of claim 2 wherein the phase difference between the square wave and the third harmonic voltage is controlled such that the maximum power is extracted from the $3^{rd}$ harmonic component.

4. The automotive electrical system of claim 2 wherein the phase difference between the square wave and the third harmonic voltage is modulated to produce a required current.

5. The automotive electrical system of claim 1 wherein the switching devices are controlled by a PWM waveform to produce a required current.

6. The automotive electrical system of claim 1 further comprising a buck converter connected between the positive bus and a second positive bus such that the buck converter controls the voltage of the first positive bus to effect charging of the battery, and wherein the first switching device is connected between the alternator neutral terminal and the second positive bus.

7. The automotive electrical system of claim 6 further comprising a second buck converter connected between the negative bus and a second negative bus such that the buck converter reduces the voltage of the second negative bus relative to the negative bus and wherein the second switching device is connected between the alternator neutral terminal and the second negative bus.

8. A method of increasing the output current of an alternator in an automotive electrical system, the method comprising:
    providing a switched current path between a neutral terminal of the alternator and at least one bus of the automotive electrical system;
    operating at least one switch corresponding to the switched current path to allow third harmonic current to flow from the neutral terminal of the alternator to the at least one bus at an idle condition.

9. The method of claim 8 further comprising:
    providing an electronic power converter between the at least one bus and a second bus of the automotive electrical system, wherein a storage battery is connected to the second bus; and
    operating the electronic power converter to control the voltage on the second bus for battery charging and allowing the voltage on the at least one bus to increase to supply greater current to a load.

10. The method of claim 8 further comprising:
    providing a second electronic power converter having an input connected to the automotive electrical system and an output connected to a field winding of an alternator; and
    operating the second electronic power converter to boost a voltage applied to the field winding.

11. The method of claim 10 wherein the second electronic power converter is controlled in response to at least one parameter selected from the group consisting of battery current and voltage regulator duty cycle.

* * * * *